Sept. 29, 1970  K. V. HACKMAN  3,531,145
BEARING CONSTRUCTION
Filed Dec. 26, 1968

INVENTOR
KENNETH V. HACKMAN
BY
ATTORNEYS

United States Patent Office 3,531,145
Patented Sept. 29, 1970

---

3,531,145
BEARING CONSTRUCTION
Kenneth V. Hackman, Arcadia, Calif., assignor to Southwest Products Company, a corporation of California
Filed Dec. 26, 1968, Ser. No. 787,129
Int. Cl. F16c *11/06*
U.S. Cl. 287—87                                          1 Claim

ABSTRACT OF THE DISCLOSURE

The outer race of a self-aligning spherical bearing is threaded as is also a shank which is integrally formed with the bearing ball portion retained by the race, and such shank has a hexagonal shouldered portion.

---

The present invention relates to an improved self-aligning bearing construction.

An object of the present invention is to provide an improved self-aligning bearing having constructional features which facilitates and simplifies mounting of the same.

These features involve generally forming the ball portion of solid construction with an integral threaded shank and with a hexagonal portion for engagement with a wrench, and in addition threading the external surface of the outer race member.

It is another object of the present invention to provide a novel self-aligning bearing construction which incorporates one or more of the above-mentioned features for achieving new advantages.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings in which:

Figure 1:
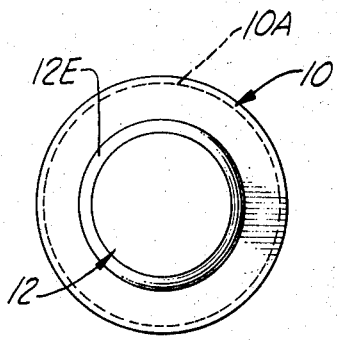
FIG. 1 is an end view of a self-aligning bearing construction embodying the present invention taken as indicated by line 1—1 in FIG. 2.
Figure 2:
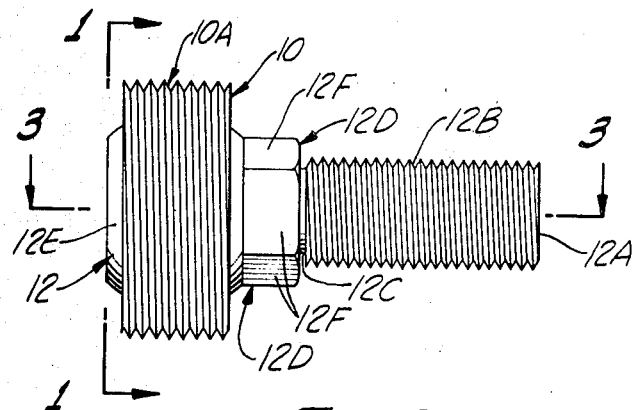
FIG. 2 is a side view of such bearing construction.
Figure 3:
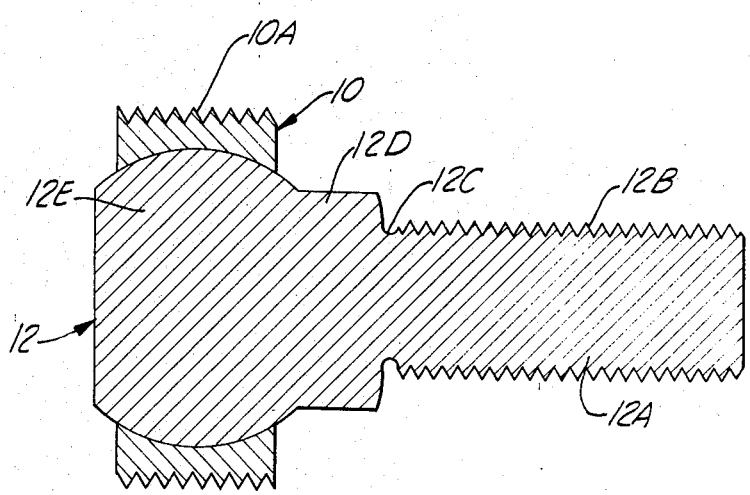
FIG. 3 is a sectional view of the same taken as indicated by line 3—3 in FIG. 2.

The self-aligning bearing construction comprises an outer race member 10 having an inner spherical bearing surface contactable with a cooperating complementary spherical surface of a ball member 12.

An important feature is that the outer race member 10 which is generally cylindrical has a means on its outer surface that permits it to be easily and quickly mounted and such means comprises an external screw threaded portion 10A, i.e., the otherwise cylindrical race member 10 is externally threaded with the threads being coaxial with the axis of such cylindrical portion.

Another important feature involves the construction of the inner ball member 12 which in this instance is solid and is formed with an integral cylindrical shank portion 12A, such shank portion 12A having an external threaded portion 12B which extends inwardly and terminates at a necked portion 12C of decreased diameter and adjacent the shouldered portion 12D. Such shouldered portion 12D is smaller than the ball portion 12E and is larger than the shank portion 12A and is provided with one or more flat portions 12F, preferably in the form of a hexagon, for engagement and turning by a wrench.

Thus, there are two screw threaded portions provided, one for releasably securing the outer race member and the other for releasably securing the ball member.

The self-aligning bearing described may either be of the metal to metal type made in accordance with the teachings of U.S. Pat. 2,727,142 of Potter and assigned to the same assignee or may be of the lined type in which non-metallic antifriction material secured to the race member contacts the ball portion as made in accordance with the teachings in the U.S. Pat. 3,085,312 of Evans and also assigned to the same assignee.

While the particular embodiments of the present invention have been shown and described, it will be obvious to those skilled in the art that changes and modifications may be made without departing from the invention in its broader aspects and, therefore, the aim in the appended claim is to cover all such changes and modifications as fall within the true spirit and scope of this invention.

I claim:

1. An article of manufacture comprising only two pieces, one of said pieces including an outer race member having an inner spherical bearing surface, the other piece comprising a ball-shaped member inside of said outer race member and having a spherical bearing surface complementary with said race member spherical surface and extending past the end of said outer race member, said outer race member having a generally cylindrical outer surface, and first means on said surface for releasably securing said outer race member to a first supporting structure, said ball-shaped member having a solid ball portion integrally formed with a shank extending radially outwardly thereof, second means on said shank for releasably securing said ball-shaped member to a second supporting structure, said first and second means each comprising a separate screw threaded portion with their axes extending generally coaxial, said other piece including a shouldered portion intermediate said screw threaded portion on the shank and said ball portion, said shouldered portion being of uniform diameter in axial section and having at least one flat portion thereon for facilitating turning and being larger than said screw threaded portion and smaller than said ball portion, said shouldered portion extending contiguously from the spherical surface of said ball portion to said screw threaded portion so as to truncate the ball and having its largest portions directly contiguous with and blending in with said ball portion without a reduced reentrant portion between said ball portion and said shouldered portion so that relative movement between said two pieces may be limited by engagement of the shouldered portion with said end portion of the outer race member by that portion of the shouldered portion closest to the ball portion.

References Cited

UNITED STATES PATENTS

| 1,295,874 | 3/1919 | Dodds | 85—1.5 |
| 3,253,330 | 5/1966 | Davies | 287—90 XR |

DAVID J. WILLIAMOWSKY, Primary Examiner

A. V. KUNDRAT, Assistant Examiner

U.S. Cl. X.R.

287—21